May 27, 1924.
A. Y. HODGDON
1,495,178
MECHANISM FOR SEGREGATING AND DELIVERING LOOSE MERCHANDISE
Filed Aug. 31, 1923    2 Sheets-Sheet 2
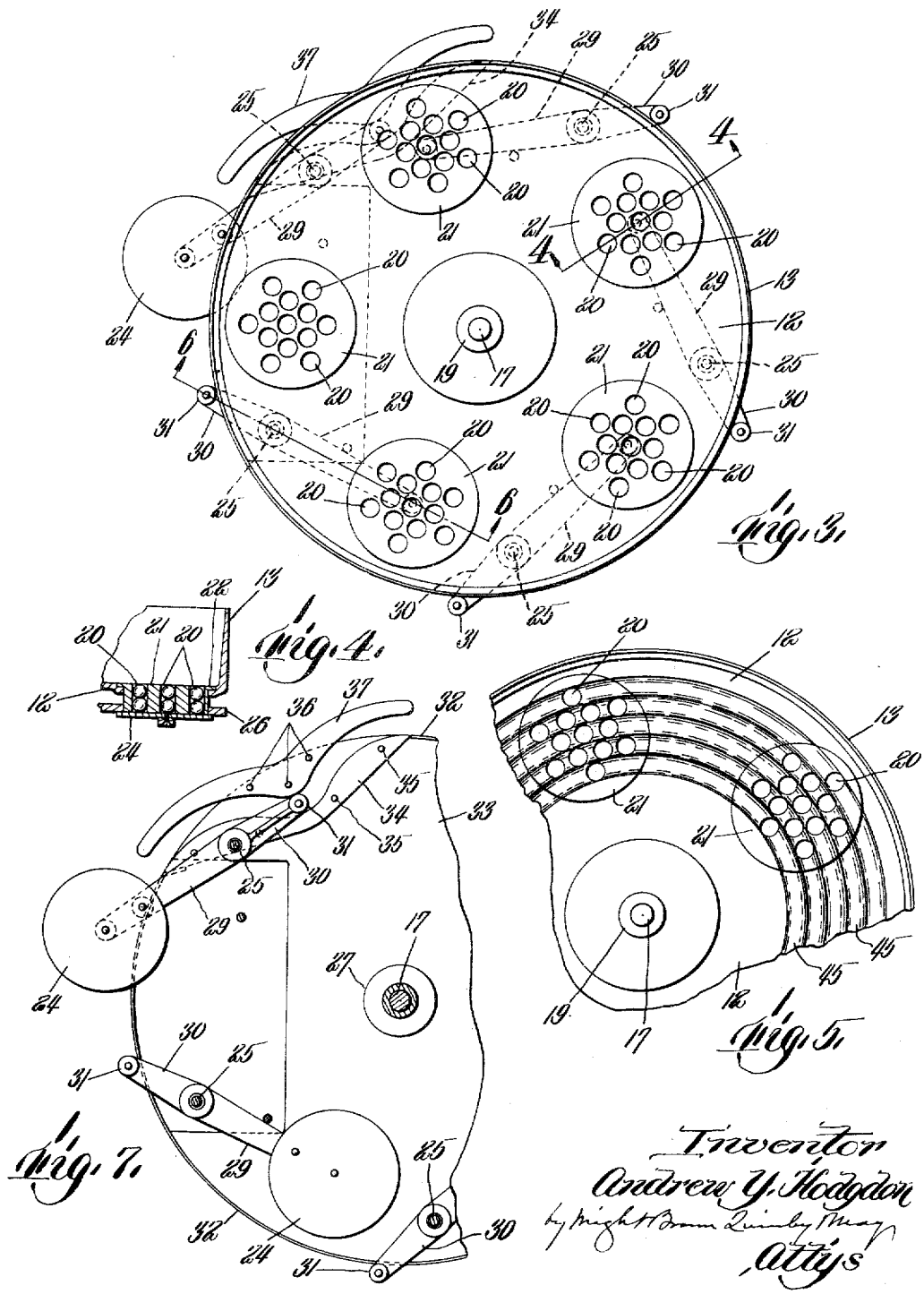

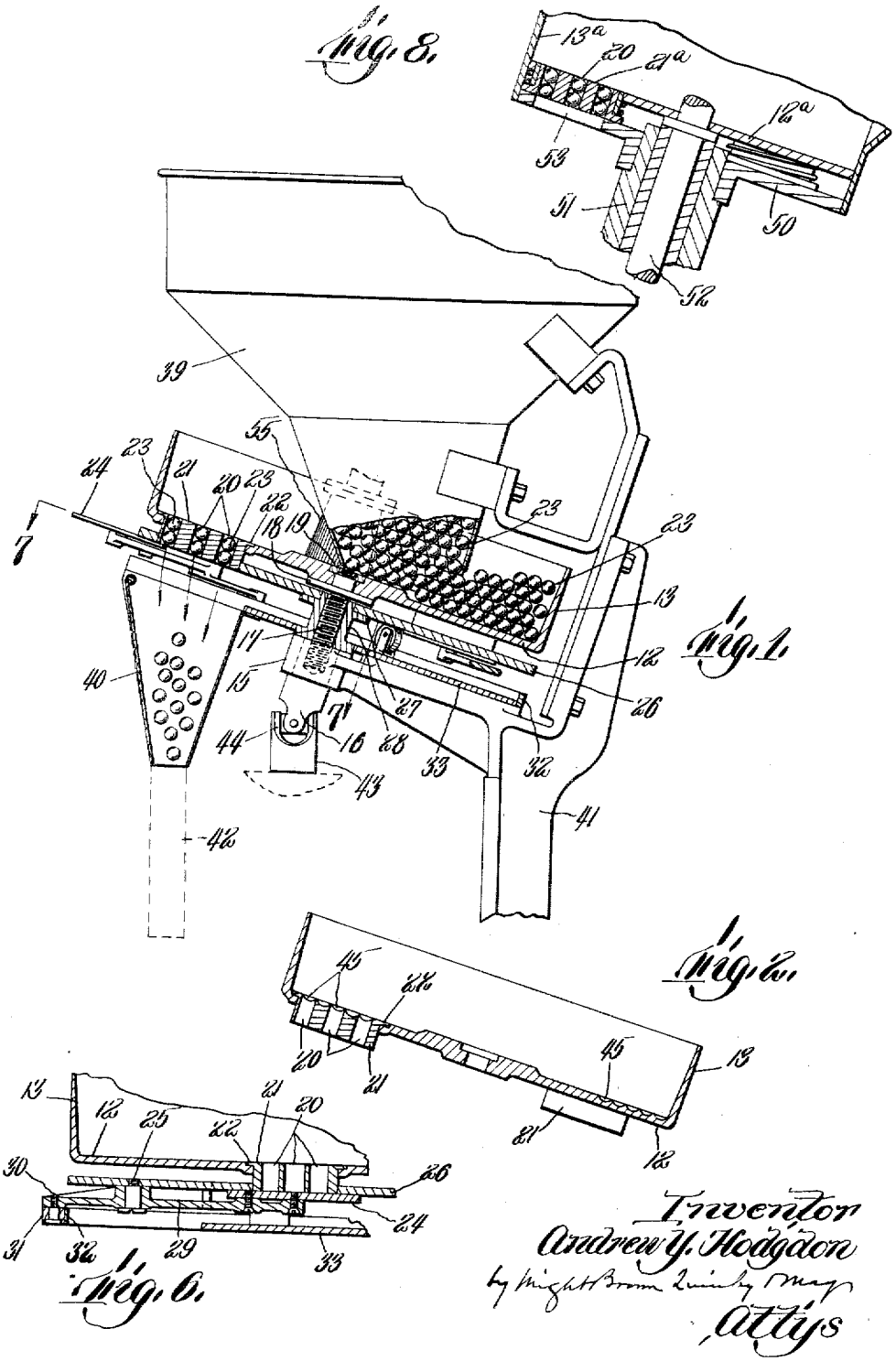

Patented May 27, 1924.

1,495,178

UNITED STATES PATENT OFFICE.

ANDREW Y. HODGDON, OF DEDHAM, MASSACHUSETTS, ASSIGNOR TO GORDON MACHINE COMPANY, OF BOSTON, MASSACHUSETTS, A CORPORATION OF MASSACHUSETTS.

MECHANISM FOR SEGREGATING AND DELIVERING LOOSE MERCHANDISE.

Application filed August 31, 1923. Serial No. 660,438.

*To all whom it may concern:*

Be it known that I, ANDREW Y. HODGDON, a citizen of the United States, residing at Dedham, in the county of Norfolk and State of Massachusetts, have invented new and useful Improvements in Mechanism for Segregating and Delivering Loose Merchandise, of which the following is a specification.

The chief object of this invention is to provide simple and effective means for segregating from a loose mass or articles, of substantially uniform shape and size, counted charges or groups of articles, each including a predetermined or counted number, and separately delivering said groups so that each group may be received by a carton, or other holder.

Of the accompanying drawings forming a part of this specification,—

Figure 1 is a sectional view, showing a mechanism embodying the invention.

Figure 2 is a sectional view of the pan shown by Figure 1, the bottom of the pan being grooved.

Figure 3 is a plan view omitting the hopper shown by Figure 1.

Figure 4 is a section on line 4—4 of Figure 3.

Figure 5 is a plan view of a portion of the pan shown by Figure 2.

Figure 6 is a section on line 6—6 of Figure 3.

Figure 7 is a section on line 7—7 of Figure 1, and a plan view of parts below said line.

Figure 8 is a fragmentary sectional view of a modification.

The same reference characters indicate the same parts in all the figures.

In the drawings, 12 represents the bottom and 13 the wall or curb of a circular pan. The pan is supported by a shaft secured to the center of the pan bottom, and journaled in a fixed bearing 15. Any suitable means may be provided for securing the shaft to the pan. In this instance the shaft includes a lower section 16, extending through the bearing 15, and an upper section 17, screwed into a tapped orifice in the section 16, and provided with a flange 18, bearing on the under side of the pan bottom, the upper end of the section 17 projecting through the bottom and having a clamping nut 19, bearing on the upper side of the bottom.

The pan bottom is provided with a circular series of groups of multiple conduits, the upper ends of which are flush with the upper surface of the bottom, their lower ends being below the bottom. The conduits are preferably formed by boring circular passages 20 in blocks 21, which are inserted in openings formed for their reception in the bottom, said blocks being preferably circular and having flanges 22 seated on rebated portions of the bottom.

The pan is adapted to hold at one side of its axis a loose mass of spherical articles of merchandise 23, which may be, for example, laundry bluing balls. Each passage 20 is formed to receive one or more of said articles, the length of each passage being in this instance, sufficient to receive two articles.

The lower ends of the passages 20 are alternately opened and closed by movable gates 24, there being one gate for each group, and the gates being in sliding contact with the lower ends of the blocks 21.

The gates 24 are fixed to two armed levers pivoted at 25 to a circular plate 26, which rotates with the pan, and is supported by the flange 27 of a collar 28 on the shaft section 17. Said levers are composed of outer arms 29, carrying the gates 24, and inner arms 30, having trundle rolls 31, which cooperate with the means next described, in oscillating the levers to open and close the gates 24.

32 represents a fixed segmental flange, formed on a base plate 33, which is below and parallel with the pan bottom and the plate 26, the flange 32 being concentric with the axis of the pan. Secured as by rivets 35 to the base plate 33, is an inner cam piece 34, the opposite ends of which join the ends of the flange 32, said outer face and flange forming a continuous track for the trundle rolls 31, and having a recessed portion formed by said outer face. Secured as by rivets 36 to the base plate, is an outer cam piece 37, the inner face of which is parallel with the outer face of the cam piece 34. The arrangement is such that when the trundle roll 31 of any gate-carrying lever is in contact with the flange 32, the gate is closed on the accompanying group of passages 20, and when the trundle roll reaches the cam pieces 34 and 37, it is first moved inward to swing the lever and gate to the position shown at the upper portion of Figure 7, the gate being thus opened and the articles in the corresponding group of conduits are released and permitted to drop from the passages. The trundle roll is then moved outward to swing the lever and gate to the position shown at the lower portion of Figure 7, the gate being thus closed and the trundle roll caused to run on the flange 32 until it again reaches the cam pieces.

The pan bottom is preferably inclined, as shown by Figure 1, and supplied with articles 23 by a hopper 39, the articles gravitating from the hopper to the lowest portion of the bottom, and there accumulating in a mass.

The arrangement is such that the groups of conduit passages, the gates of which are closed, pass under the mass of articles, the conduits of these groups being charged with the articles, each group containing a predetermined number of articles. Each group passing away from the mass remains closed until it reaches a position over a chute 40 under the higher portion of the pan, the gate of this group being then opened by the means above described to liberate the articles and permit them to drop into the chute.

The bearing 15 and base plate 23 may be fixed to a support, such as a standard 41, forming a part of the frame of a packaging machine. The machine may include an endless carrier adapted to move a series of cartons 42, step-by-step and hold each in position to receive a counter charge of articles from the chute 40.

The machine may also include a suitably driven shaft section 43, connected, as by a universal joint 44, with the shaft section 16. To ensure the filling of all the passages of each group, the upper side of the pan bottom may be provided with circular grooves 45, concentric with the axis of the pan. The relative arrangement of the grooves and the passages is such that the receiving end of each conduit is in a groove, as shown by Figure 5.

The hopper 39 is preferably of the approximately conical form shown by Figure 1, its axis being substantially vertical. The discharging end of the hopper is adjacent to the pan bottom 12 and within the curb 13. This relative arrangement of the hopper and the pan, the latter being inclined, as shown by Figure 1, causes spherical articles or balls 23 to accumulate, in a pile composed of layers, at the lowest portion of the pan, the layers being parallel with the pan bottom, and the balls of the bottom layer being regularly arranged on the pan bottom, so that they are confined in position to drop accurately into the passages 20. Said passages are so arranged that the center of each passes directly under the centers of several of the balls of the bottom layer, provision being thus made for the filling of each passage when it is passing under the bottom layer of balls.

The accumulated pile of articles, constantly remains at such height that the upper layers obstruct the discharge end of the hopper without overflowing over the curb 13, the articles escaping from the hopper only as fast as they are taken in by the conduit passages. The balls are therefore fed automatically and intermittently into the pan.

To prevent more than the predetermined number of articles from being carried by the multiple conduits to the delivering point, I provide a brush 55, which bears on the portion of the pan bottom, emerging from the pile, and sweeps therefrom any articles not fully inserted in the conduit passages. Said brush may be mounted on a shaft which is journaled in a fixed bearing above the pan bottom, and may be rotated by any suitable means.

The pan and the passages of the multiple conduits may be adapted for use with articles of substantially uniform size and shape not necessarily spherical, such as so called gum drops and cough drops, and any other articles adapted to be fed into the pan and to drop into the passages of multiple conduits in the bottom of the pan.

A modification is shown by Figure 8, in which the multiple conduits are carried by a bottom 12$^a$ which is rotated in a fixed curb 13$^a$. The lower ends of the blocks 21$^a$ in which the conduit passages 20 are formed, rest and slide on a fixed plate 50, supported by a fixed bearing 51, in which is journaled the shaft 52, whereby the bottom 12$^a$ is rotated, the bottom being suitably secured to the shaft, and the curb 13$^a$ being fixed to the plate 50. Said plate is provided at one side of the axis of the bottom 12$^a$ with an outlet opening 53, adapted to register with one of the multiple conduits at a time, the plate being elsewhere closed so that it closes all but one of the conduits. The arrangement is such that articles from a mass deposited on the bottom 12$^a$ above the closed conduits drop into the passages thereof, and are confined therein by the plate 50. When any conduit registers with the outlet 53 the articles therein are released in a counted group.

It will be seen that the fixed plate 50 constitutes an embodiment of means caused by the rotation of the pan bottom to open a multiple conduit at one side of the axis and close the other conduits, said means being the equivalent of the means provided by the movable gates and the mechanism for operating the same previously described.

The plate 26 constitutes a gate carrier which is independent of the pan bottom 12, and permits a more convenient installation of the gates 24, than would be the case if the gate levers were pivoted to the pan bottom, as shown by the Lane and Macnaughtan Patent No. 1,454,060, dated May 8, 1923, the carrier 26 and the gates carried thereby being applicable to and removable from the supporting structure as a unit.

The carrier 26, the gates carried thereby, and the fixed cam-shaped track which cooperates with the gate levers in opening and closing the gates, may constitute elements of a mechanism which includes single passage conduits, such as those shown by the above-mentioned patent, instead of the multiple conduits here shown.

I claim:

1. Mechanism for segregating and delivering loose articles, comprising a rotary pan having a bottom adapted to support a mass of articles at one side of its axis, and provided with a circular series of openings concentric with its axis; means for rotating the pan; a series of counting blocks fixed in said openings with their upper ends substantially flush with the upper surface of the bottom, each block being provided with a predetermined number of independent conduits extending from its upper to its lower end, each conduit being formed to receive a predetermined number of articles of uniform size and shape from said mass; valves slidable across and normally closing the lower ends of said conduits, to determine the capacity of the conduits and support the received articles therein, said articles constituting a counted group, composed of a number determined by the capacity of the conduits; and means operable by the rotation of the pan for displacing a valve at the side of the axis remote from the said mass, to release a group previously supported by said valve.

2. Mechanism for segregating and delivering loose articles substantially as specified by claim 1, the upper surface of the pan bottom and the upper ends of the counting blocks being provided with arcuate grooves, the grooves in the blocks being continuations of the grooves in the bottom and intersecting the receiving ends of the conduits, to ensure accuracy in the filling of the latter.

In testimony whereof I have affixed my signature.

ANDREW Y. HODGDON.

Certificate of Correction.

It is hereby certified that the name of the assignee in Letters Patent No. 1,495,178, granted May 27, 1924, upon the application of Andrew Y. Hodgdon, of Dedham, Massachusetts, for an improvement in "Mechanism for Segregating and Delivering Loose Merchandise," was erroneously written and printed as "Gordon Machine Company," whereas said name should have been written and printed as *Gordan Machine Company*, as shown by the records of assignments in this office; and that the said Letters Patent should be read with this correction therein that the same may conform to the record of the case in the Patent Office.

Signed and sealed this 5th day of August, A. D. 1924.

[SEAL.]

WM. A. KINNAN,
*Acting Commissioner of Patents.*